United States Patent
Matsunaga (10) Patent No.: US 6,476,780 B2
(45) Date of Patent: *Nov. 5, 2002

(54) ROAD IMAGE DISPLAY DEVICE

(75) Inventor: Shinichi Matsunaga, Wako (JP)

(73) Assignee: Honda Giken Kogyo Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/003,540

(22) Filed: Jan. 6, 1998

(65) Prior Publication Data

US 2002/0109679 A1 Aug. 15, 2002

(30) Foreign Application Priority Data

Jan. 7, 1997 (JP) .............................. 9-031044

(51) Int. Cl.$^7$ ............................. G09G 3/18; G09G 3/20
(52) U.S. Cl. .................................. 345/56; 345/50
(58) Field of Search .......................... 345/50, 56, 682, 345/684, 687, 688, 689; 340/990, 995, 998, 905; 701/211, 212, 208

(56) References Cited

U.S. PATENT DOCUMENTS

| | | | | |
|---|---|---|---|---|
| 4,757,455 A | * | 7/1988 | Tsunoda | 364/988 |
| 4,819,169 A | * | 4/1989 | Saitoh et al. | 364/424.02 |
| 5,115,398 A | * | 5/1992 | De Jong | 364/443 |
| 5,146,216 A | * | 9/1992 | Zechnall | 340/995 |
| 5,161,886 A | * | 11/1992 | De Jong et al. | 364/449 |
| 5,315,295 A | * | 5/1994 | Fujii | 340/936 |
| 5,420,582 A | * | 5/1995 | Kubbat et al. | 340/961 |
| 5,459,667 A | * | 10/1995 | Odagaki et al. | 364/444 |
| 5,742,240 A | * | 4/1998 | Asanuma et al. | 340/995 |
| 5,748,109 A | * | 5/1998 | Kosaka et al. | 340/995 |
| 5,802,492 A | * | 9/1998 | De Lorme et al. | 701/200 |
| 5,844,570 A | * | 12/1998 | Curtright et al. | 345/435 |
| 5,884,219 A | * | 3/1999 | Curtwright et al. | 701/213 |
| 5,938,707 A | * | 8/1999 | Uehara | 701/41 |
| 5,945,927 A | * | 8/1999 | Nakayama et al. | 340/995 |
| 5,945,976 A | * | 8/1999 | Iwamura et al. | 345/139 |
| 5,956,250 A | * | 9/1999 | Gudat et al. | 364/424.031 |

* cited by examiner

Primary Examiner—Vijay Shankar
(74) Attorney, Agent, or Firm—Lyon & Lyon LLP (57) ABSTRACT

A road image display device for displaying an image of a road whereon a vehicle is travelling on a display screen by scrolling the road image at a specified speed as one would feel driving a vehicle thereon viewing the image from a fixed viewing point, which display device is provided with an input control section for inputting road design data concerning a straight line area, a clothoid curve (relaxed-curvature curve) area and a circular-arc area for a travelling road distance, and an electronic control unit for generating a road image representing a straight-line area, clothoid curve area and a circular-arc area according to the input road design data and which can easily generate any desired road image according to a free road design and more particularly can represent an image of a curved road portion by a curve having a relaxed curvature for joining a straight-line with a circle of a constant curvature.

5 Claims, 12 Drawing Sheets

- Calculating a clothoid parameter
- Determining a zero crossing point Po
- Calculating a value PsPo (length)
- Calculating coordinates of Ps in the Global coordinates system and a tangential vector
- Updating an integration start point and an integration end point
- Calculating coordinates of Pt in the Global coordinates system and a tangential vector
- Transforming coordinates of Pt to that with reference to Ps in the coordinate system
- Calculating a rotation parameter of Pt relative to Ps

ROAD IMAGE DISPLAY DEVICE

BACKGROUND OF THE INVENTION

The present invention relates to a road image display device for generating a road image according to road design data and displaying the generated road image on a display screen.

Recently, there has been developed such a road image display device which is used for displaying a desired road image by scrolling the road image at a specified speed as if one could feel driving a vehicle thereon viewing from a fixed viewpoint and which is applied to simulation for developing an image processing algorithm for recognizing a road from road image ahead of an automatic travelling vehicle, which road image is taken through a video camera attached to the vehicle or which is applied to visual presentation for road design analysis.

The conventional display device generates a desired road image by previously preparing a two-dimensional road image by using a road distance pattern. Consequently, it takes along time to generate the road image.

The conventional device can not generate a road image according to an optional pattern and can not represent actual up-and-down slopes and banks of a road since it has only the ability to produce a two-dimensional road image.

SUMMARY OF THE INVENTION

Accordingly, a primary object of the present invention is to provide a road image display device which is provided with means for inputting road design data concerning a straight line area, a clothoid curve (relaxed-curvature curve) area and a circular-arc area for a travelling road distance and means for generating a road image representing a straight-line area, clothoid curve area and a circular-arc area according to the input road design data a and which display device can easily generate any desired road image according to a free road design and, more particularly, can represent an image of curved road portion by a curve having a relaxed curvature for joining a straight-line with a circle of a constant curvature.

Another object of the present invention is to provide a road image display device which is further provided with means for inputting road design data concerning upward and downward slopes and banks for a distance of a travelling road to generate a road image representing upward and downward slopes and banks of the road according the input road design data.

A further object of the present invention is to provide a road image display device which is further provided with means for selectively changing a viewing point position relative to a travelling road image being taken through a camera at a fixed viewpoint and displayed on a display screen by scrolling at a specified speed as if driving thereon to generate a road image being viewed from the selected viewpoint position, thus making it possible to freely produce a road image being viewed from a desired viewpoint that is positioned, e.g., at a specified level on a center line or a left lane on a current road image or produce a road image following the changing of lanes by gradually changing a viewpoint from the right to the left or vice versa.

DESCRIPTION OF THE PREFERRED EMBODIMENT

The preferred embodiment of the present invention will be described in detail by way of example and with reference to the accompanying drawings.

Figure 1:
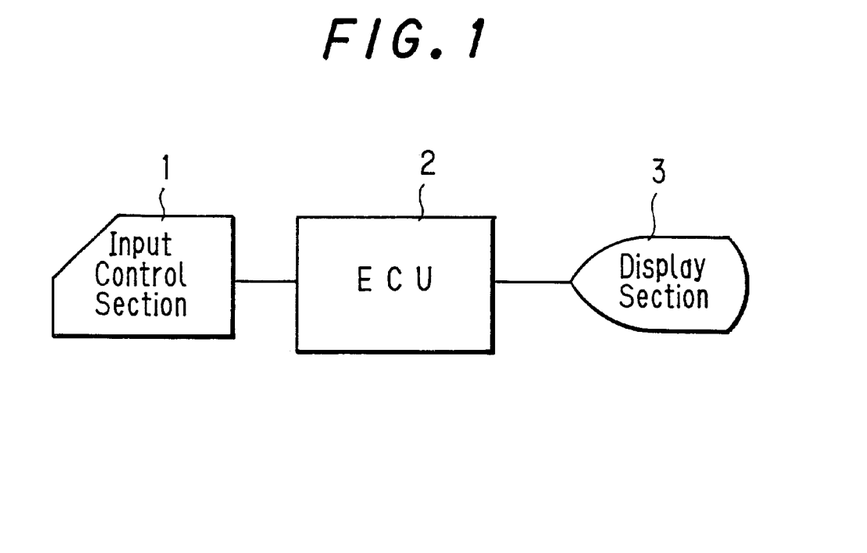
FIG. 1 is a construction block-diagram of a road image display device embodying the present invention.

As shown in FIG. 1, a road image display device according to the present invention comprises an input control section 1 for inputting road design data, control data for changing a preset viewpoint position (corresponding to a fixed position of a video-camera attached to a vehicle for taking a road image ahead of the vehicle) to a desired point on a current road image, and other various kinds of control signals such as signals for starting and stopping scrolling of a road image on a display screen, changing an image scrolling speed and SQ on, an ECU (Electronic Control Unit 2) for generating a road image being viewed from a specified viewpoint position according to input road design data, displaying the generated road image on a display screen and performing various kinds of control operations, e.g., scrolling the road image on a display screen at a specified speed so one can feel like driving his or her own vehicle on a road in the image, and a display section 3 for displaying a generated road image on its screen.

Figure 2:
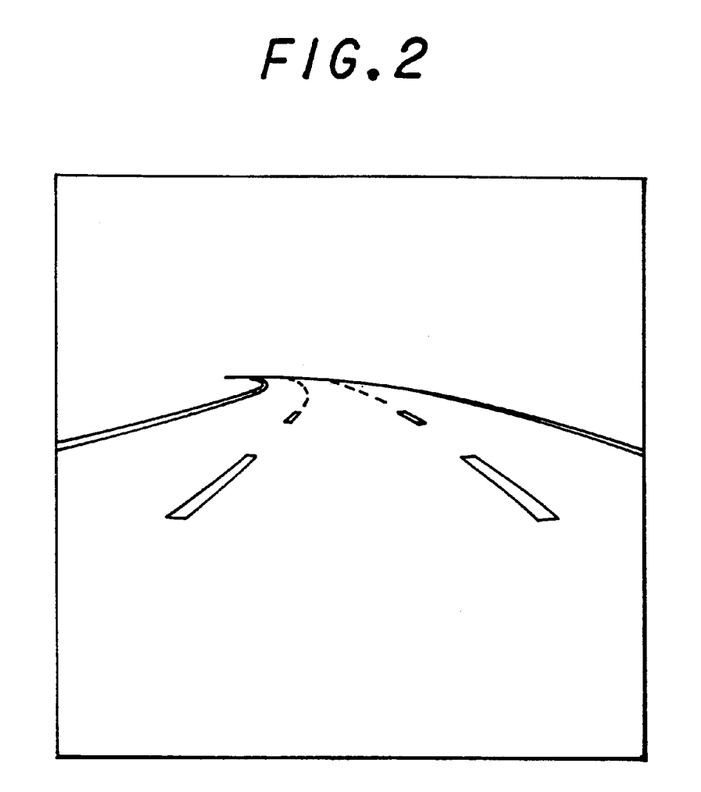
FIG. 2 is illustrative of an exemplified road image displayed on a display screen.

FIG. 2 shows an example of a road image formed by the ECU 2 and displayed on the screen of the display section 3.

Figure 3:
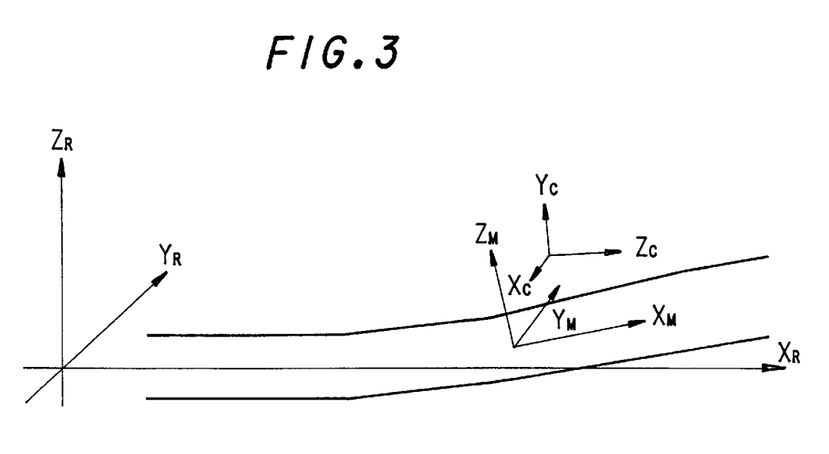
FIG. 3 shows a correlation between a road coordinate system, a vehicle coordinate system and a camera viewpoint coordinate system.

As shown in FIG. 3, a road coordinate system (xa, Yr, Zr), a vehicle coordinate system (Xm, Ym, Zm) and a camera viewpoint coordinate System (Xc, Yc, Zc) are set for generating a road image. An angle of rotation is taken as positive when measured in the positive direction from the reference axis.

The road coordinate system (Xr, Yr, Zr) is a right-handed coordinate system (Global coordinate system) where the origin is set at a start point of a road model, Xr-axis is taken in the direction of the road on which the vehicle is traveling, a Zr-axis is taken as positive in a vertical direction and a Yr-axis is taken as positive at the left side from the origin.

The vehicle coordinate system (Xm, Ym, Zm) is a right-handed coordinate system where the origin is set at a center of a vehicle, an Xm-axis represents a vehicle running direction and a value on the Xm-axis is taken as positive in the running direction and a Zm-axis is taken as positive in an upward vertical direction. The origin of the vehicle coordinate system is regarded to be in contact with a road surface.

The camera viewpoint coordinate system (Xc, Yc, Zc) is a coordinate system where the origin is set at a viewpoint of a camera, a Zc-axis represents a viewing line and is taken as positive in the viewing line direction, a Yc-axis is parallel to a vertical line of an image pickup plane and positive in an upward direction from the origin, a Xc-axis is parallel to a horizontal line of the image pickup plane and positive at the right side from the origin.

A road to be designed has a three-dimensional structure in view of upward-and-downward slopes and banks featuring a highway structure according to the highway construction standard. The road is represented by straight lines, clothoid curves and circular arcs in horizontal and vertical directions respectively.

The clothoid curve is a curve of relaxed curvature to be interposed at a curvature changing point of a super-highway road which must be designed to be of high performance according to the highway construction standard.

Figure 4:
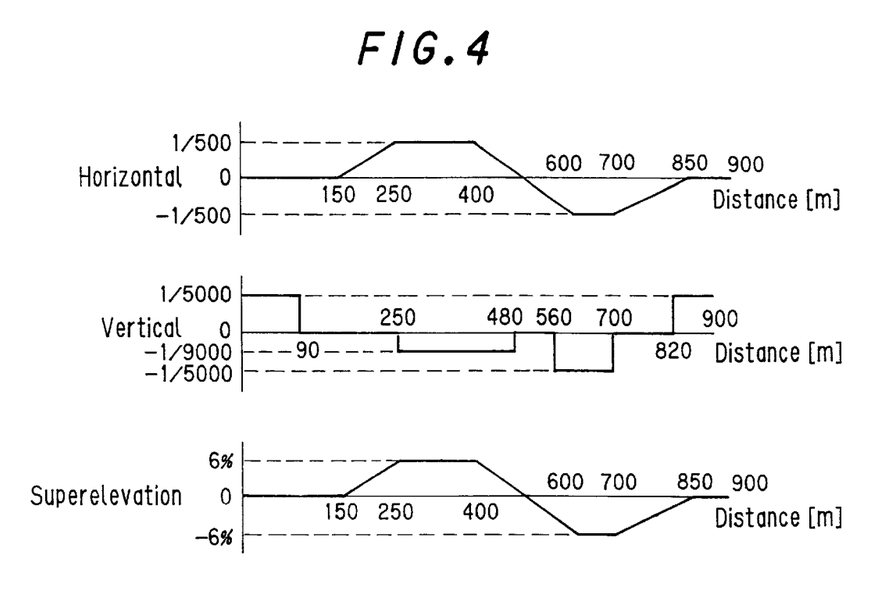
FIG. 4 shows an exemplified characteristic of road design data.

The road design data represents a road for a travelling road distance along the road center line by a curvature in horizontal and vertical (crossing) directions and an super-elevation (bank) ratio (%). When designing a road shown for example in FIG. 3, a designer writes, in an input data file, input data such as a start point, an end point, a road distance to a node at which a curvature and a bank change, a radius of curvature (reciprocal of a curvature), and a pitch. The data file for designing the road of FIG. 4 is shown in Table 1. In inputting design data, a radius of curvature and a curvature for points other than nodes are written in terms of 99999 for convenience of processing. The same type of data file can be developed for existing roads for which original design data does not exist by taking appropriate measurements of that road.

TABLE 1

| Distance [m] | Radius of curvature [m] horizontal | Radius of curvature [m] vertical | Super-elevation [%] |
|---|---|---|---|
| 0 | 0 | 5000 | 0 |
| 90 | 99999 | 5000 | 99999 |
| 90 | 99999 | 0 | 99999 |
| 150 | 0 | 99999 | 0 |
| 250 | 500 | 0 | 6 |
| 250 | 99999 | −9000 | 99999 |
| 400 | 500 | 99999 | 6 |
| 480 | 99999 | −9000 | 99999 |
| 480 | 99999 | 0 | 99999 |
| 560 | 99999 | 0 | 99999 |
| 560 | 99999 | −5000 | 99999 |
| 600 | −500 | 99999 | −6 |
| 700 | −500 | −5000 | −6 |
| 700 | 99999 | 0 | 99999 |
| 820 | 99999 | 0 | 99999 |
| 820 | 99999 | 5000 | 99999 |
| 850 | 0 | 99999 | 0 |
| 900 | 0 | 5000 | 0 |
| . | . | . | . |
| . | . | . | . |
| . | . | . | . |

A lane changing method is such that a vehicle moves a distance from a lane changing point read from a lane changing data file to a target point determined by using a preset parameter for lane changing time, at which time the vehicle may run along a desired lane. In practice, the vehicle moves sideways by a distance of its body width. The vehicle's movement when changing lanes is approximated by a quadratic curve.

Figure 5:
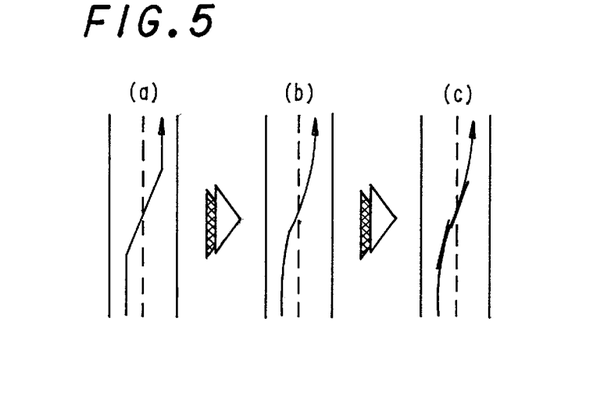
FIG. 5 shows a procedure of changing a current lane to another.

FIG. 5 depicts a procedure allowing a vehicle to transfer from a current lane to a neighboring lane. Namely a target tracing line is generated (FIG. 5a) and approximated by a quadratic curve (FIG. 5b), then an inclination of each point is determined (FIG. 5c).

A distance from a start point to a point at which the vehicle begins transfer to a neighboring lane and a lane changing direction are written into the lane changing data file. The movement of the vehicle to the rightward lane is taken as positive (+) and the movement to the leftward lane is taken as negative (−).

For example, data shown in Table 2 is entered into the lane changing data file to cause the vehicle to change to a right lane after travelling a distance of 200 m from the start point and change again to a left lane after travelling a distance of 500 m from the start point.

TABLE 2

| Traveling Distance (m) from Start Point | Identifier of Lane to which vehicle transfers |
|---|---|
| 200 | −1 |
| 500 | 1 |

Data to be optionally input is defined as shown in Table 3.

TABLE 3

| Option | Camera Parameters | (double)yaw,pit,rol Yaw, Pitch, Roll Angle [rad] (double)fc,hc Focus [mm], Mount Level [m] |
|---|---|---|

TABLE 3-continued

| | | |
|---|---|---|
| | | (double)xalp,yalp<br>Coefficient of transforming from image memory to image pickup plane [mm/dot] |
| Road<br>Parameters | | (double)wroad,wwhite<br>Road Width, White Stripe Width<br>(double)de_wh,sp_wh<br>Broken Line Length, Broken Line Spacing [cm]<br>(int)n_lane<br>The number of lanes |
| MyCar<br>Vehicle<br>Parameters | | (double)velo<br>Running Speed [km/h]<br>(int)st,pos_st<br>Start Point [cm], Start Position [No.] * 1, 2, 3 ... from the leftmost lane.<br>(double)t_lc<br>Time for lane change [msec] |
| Other<br>parameters | | (int)pro_cy,delay<br>Processing cycle, image input delay time [msec]<br>(int)frm<br>Only a frame is output?<br>(No painting)[1/else]<br>(int)gray,bg_gry<br>Optical density of white line, optical density of background<br>(Char)*intact<br>Interactive mode [on/off]<br>(inst)sl Sleep (interruption) time [sec] |

Figure 6:
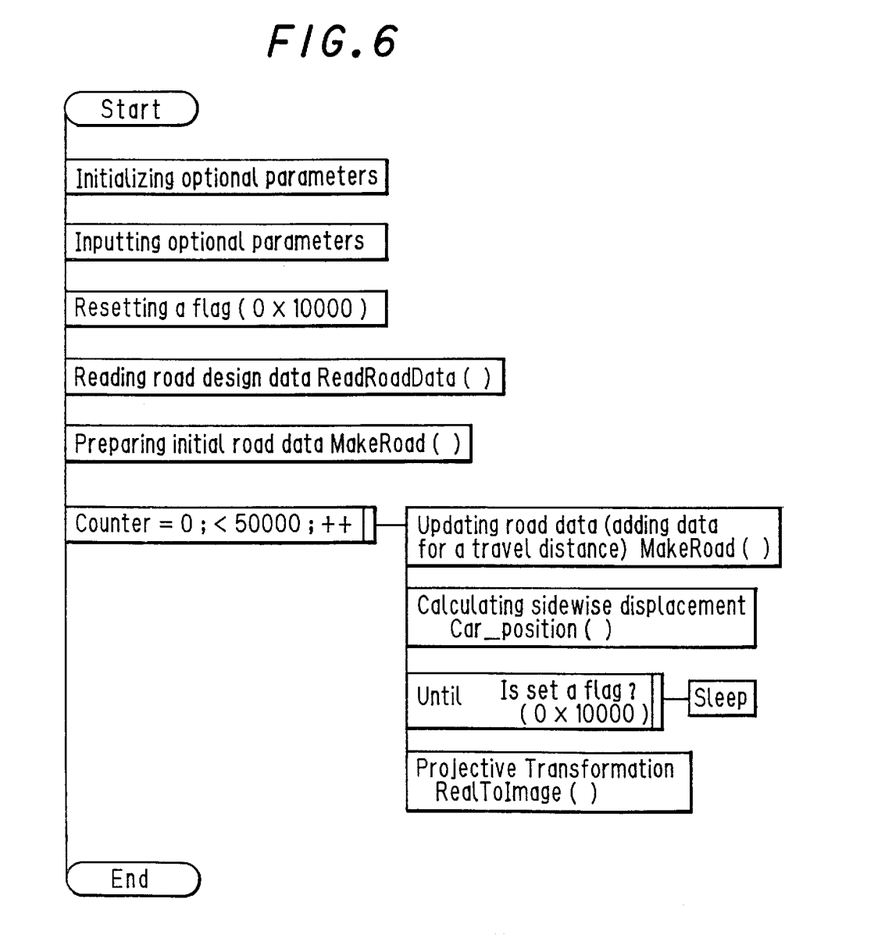
FIG. 6 is an exemplified flowchart generating a road image according to the present invention.

The procedure of processing to be performed by the ECU 2 in this instance is shown in FIG. 6.

Default values of the optional parameters are shown in Table 4.

TABLE 4

| Option | Camera<br>Parameters | yaw | 0.0 |
|---|---|---|---|
| | | pit | 0.052360 |
| | | rol | 0.0 |
| | | fc | 12.0 |
| | | hc | 1.15 |
| | | xalp | 0.0115 |
| | | yalp | 0.0095 |
| | Road<br>Parameters | wroad | 350.0 |
| | | wwhite | 20.0 |
| | | de_wh | 800.0 |
| | | sp_wh | 1200.0 |
| | | n_lane | 2 |
| | MyCar<br>Vehicle<br>Parameters | velo | 100.0 |
| | | st | 0.0 |
| | | pos_st | 1 |
| | | t_lc | 2.0 |
| | Other<br>parameters | pro_cy | 100 |
| | | delay | 0 |
| | | frm | 1 |
| | | gray | 200 |
| | | bg_gray | 0 |
| | | *intact | "off" |
| | | sl | 0 |

The operation of reading the road design data "ReadRoad Data( )" will be described below in detail wherein:

Input: char *ro_fname ... Road Design Data File
Output: Plan rplan_h[ ], rplan_v[ ], rplan_b[ ] ... Road Model Design Data
  int num_h, num_v, num_b ... The number of nodes (horizontal, vertical, superelevation) in the Road Design Data In performing the reading operation "ReadRoadData( )", the road data is read from the road design data file, the road data for respective nodes is entered into a Plan (road model design data) type variables rplan_h[ ], rplan_v[ ], rplan_b[ ] (horizontal, vertical and bank in the described order) and the number of nodes is entered into each of the parameters of num_*.

The plan type variables are defined as shown in Table 5.

TABLE 5

| rplan_*[k]<br>k: node | short spec | Identifying a kind of road between [k-1,k]:<br>−1 = ERROR, 0 = Straight line,<br>1 = Clothoid, 2 = Circular arc |
|---|---|---|
| | int dis | Position of node k (distance) [cm] |
| | double curv | Curvature or pitch at node [cm] |
| | double alpha | Rotation angle with reference to preceding node k-1 |
| Delta | double x<br>double y | Displacement from reference preceding node k-1 [cm] |

Figure 7:
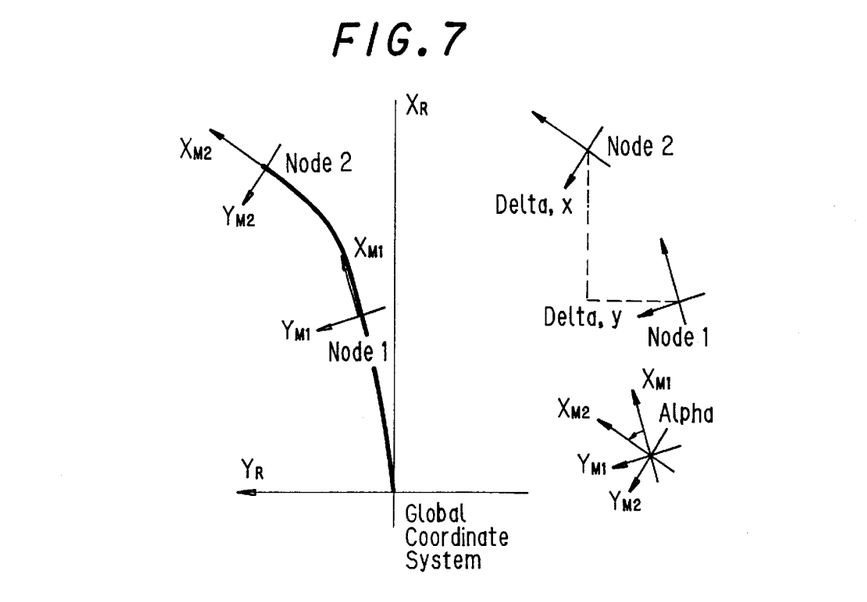
FIG. 7 shows a relation between a parallel displacement of an origin and a rotation angle of coordinate axes of a coordinate system in which each node is given with reference to a precedent node in road design data.

In the step of ReadRoadData( ), the ECU 2 calculates, for each node in the road design data, a parallel displacement of the origin of the coordinate system with reference to a preceding node and an angle of rotation of the coordinate axes. For example, results of calculations for only a horizontal curve are as shown in FIG. 7. The data will be used by a road data preparing function MakeRoadData( ) to be described later.

Figure 8:
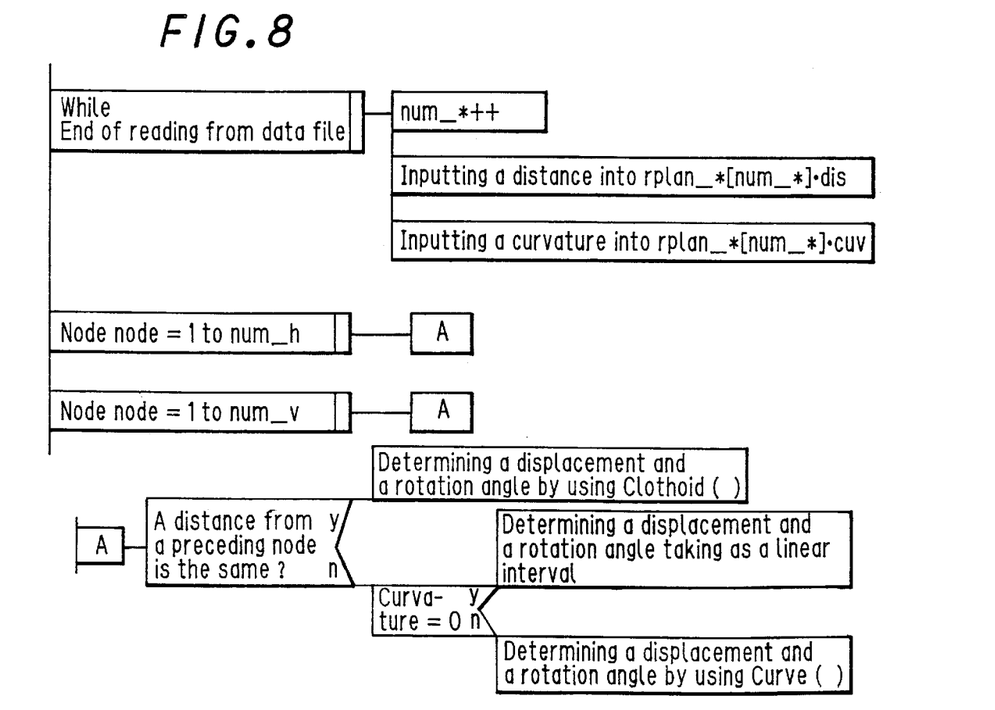
FIG. 8 is an exemplified flowchart showing a procedure for determining a parallel displacement of an origin and a rotation angle of coordinate axes of a coordinate system in which each node is given with reference to a precedent node in a road design data.

The above-mentioned processing procedure of the ECU 2 is shown in FIG. 8.

Clothoid( ) and Curve( ) are functions for determining a displacement and a rotation angle at an input position (remarkable point) with reference to a preceding node for a clothoid curve and a circular arc respectively.

The function Clothoid( ) is described in detail as follows:

Input: Int length ... A distance from a preceding node Int node ... Number of preceding Node (at which a section including a remarkable point begins)
Output: double *X, *Y, *theta ... Displacement and angle of rotation (rad) with reference to a preceding node The clothoid curve may be briefly defined as a curve whose length and curvature are proportional to each other. It may be expressed as $1/r = s/a^2$ where r is a radius of curvature, s is a length from the origin and a is so called clothoid parameter. Coordinates of a point M on the clothoid curve is given by the following equation (1).

$$\left. \begin{array}{l} x = a\sqrt{\pi} \int_0^t \cos(\pi u^2/2) du \\ y = a\sqrt{\pi} \int_0^t \sin(\pi u^2/2) du \end{array} \right\} \quad (1)$$

$$\left( -\infty < t < \infty, t = s/a\sqrt{\pi}, s = \widehat{OM}, a > 0 \right)$$

Figure 9:
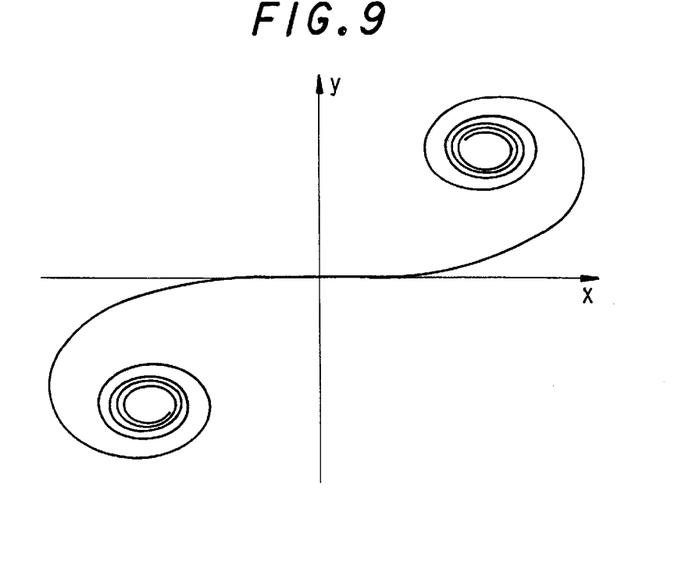
FIG. 9 shows an exemplified clothoid curve.

FIG. 9 shows an example of a clothoid curve when a is equal to 325.0 (a=325.0) and s is not less than −2500.0 and not more than 2500.0 (−2500.0≦s≦2500.0).

Figure 10:
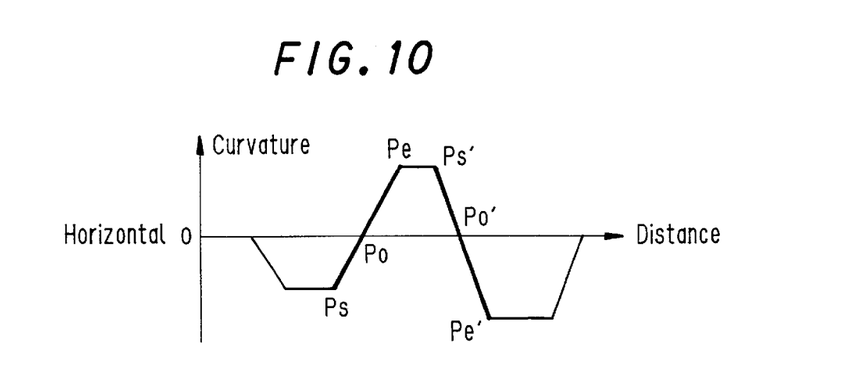
FIG. 10 shows an exemplified characteristic of design data of horizontal components of a curved area of a road.
Figure 11:
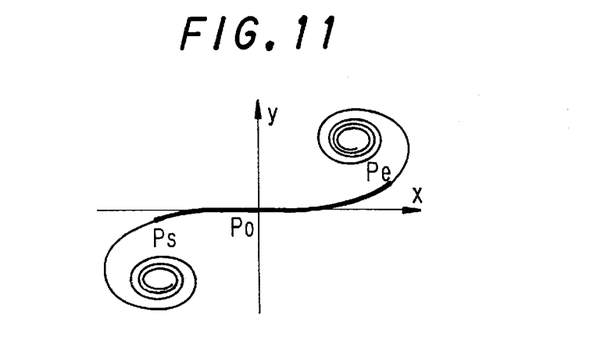
FIG. 11 shows an example of a clothoid curve in road design data.
Figure 12:
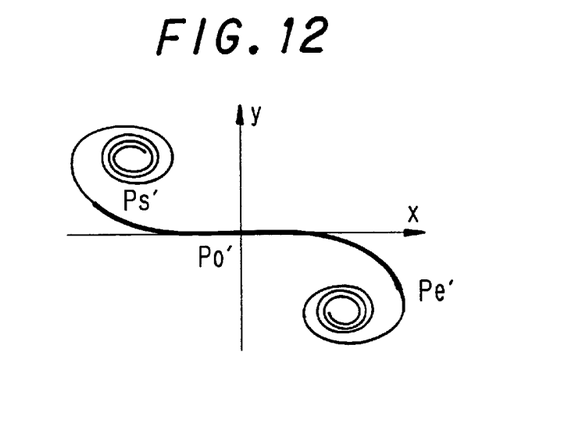
FIG. 12 shows another example of a clothoid curve in road design data.

In road design data, an interval Ps-Pe of FIG. 10 represents a clotoid curve of FIG. 12 and an interval Ps'-Pe' of FIG. 10 represents a clothoid curve of FIG. 12. In FIG. 10, Po and Po' are points at which a curve having a curvature of 0 intersects.

The clothoid curve shown in FIG. 11 is given by Equation (2) and the clothoid curve shown in FIG. 12 is given by Equation (3).

$$x = a\sqrt{\pi} \int_0^t \cos(\pi u^2/2) du \\ y = a\sqrt{\pi} \int_0^t \sin(\pi u^2/2) du \quad (2)$$

$$x = a\sqrt{\pi} \int_0^t \cos(\pi u^2/2) du \\ y = -a\sqrt{\pi} \int_0^t \sin(\pi u^2/2) du \quad (3)$$

Figure 13:
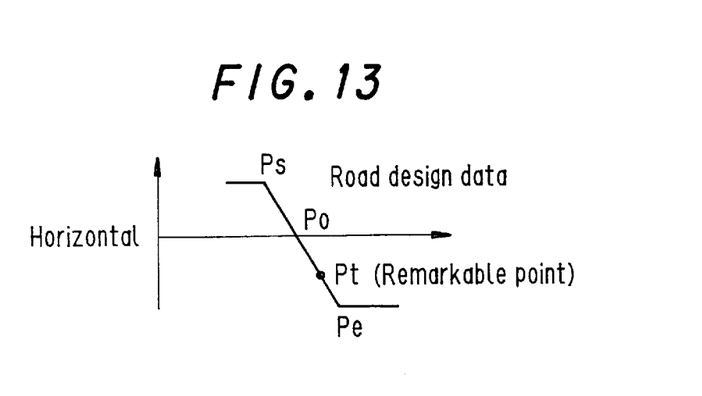
FIG. 13 shows another exemplified characteristic of design data of horizontal components of a curved portion of a road.
Figure 14:
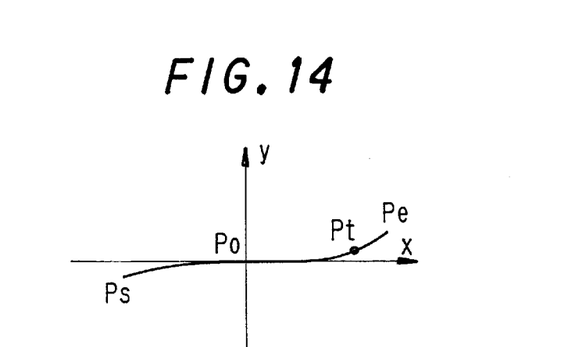
FIG. 14 shows another example of a clothoid curve in the road design data of FIG. 13.
Figure 15:
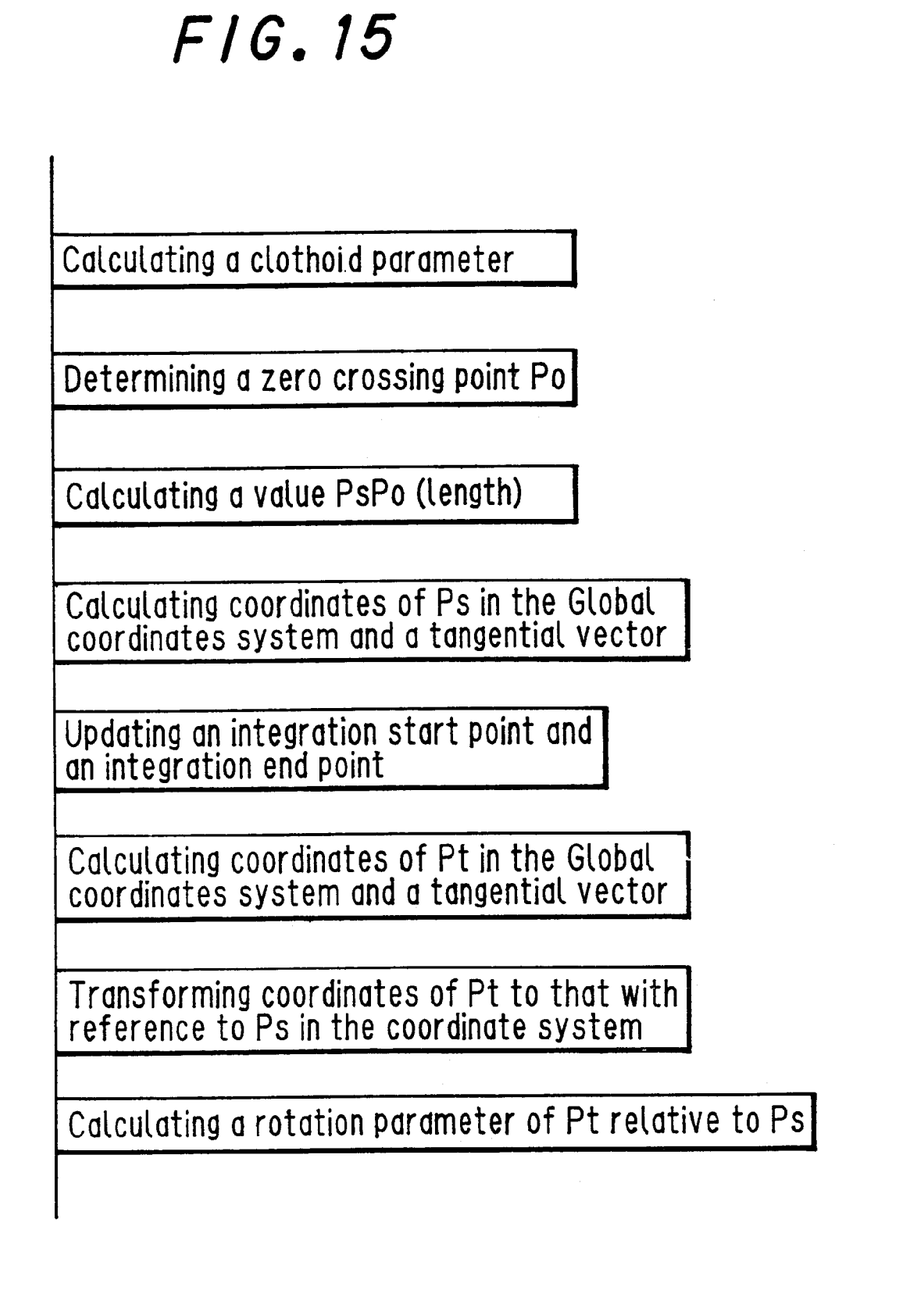
FIG. 15 is an exemplified flowchart showing a procedure for obtaining a clothoid curve based on road design data.

FIG. 15 depicts the operation procedure of the ECU 2 when determining a clothoid coordinate system shown in FIG. 14 according to the road design data shown in FIG. 13. In those Figures, pt denotes a remarkable point.

The function "Curve( )" is now described below in detail wherein:

Input: int length . . . A distance from a preceding node

Output: double *X, *Y, *theta . . . A displacement and an angle of rotation (rad) from a reference preceding node The function Curve ( ) is used for determining a transformation parameter of the remarkable point relative to a preceding node from a length with reference to preceding node utilizing the property of a circle.

The function "MakeRoad ( )" for generating a center line of a road is described below in detail wherein, Input: Plan rplan_h[ ], rplan_v[ ], rplan_b[ ] . . . Road model design data double dw, sw . . . Broken line length and broken line spacing st, en . . . Starting and ending points of a road to be generated Output: Road road [ ] . . . Road center-line data The function MakeRoad ( ) determines a Road type data "road [ ]" of the road center line within the range [st, en] represented by a distance from the origin of the road model (zero point of the road design data) from the Plan type data "rplan_*[ ]" such as a rotation angle and displacement from a preceding node and a curvature at each node obtained by using the function ReadRoadData ( ).

The Road type data "road [ ]" contains structure members shown in Table 6 at an interval of 1 cm only for a center line of a road. In Table 6, k denotes a travelling distance in terms of an index in a local vehicle's coordinate system. k=1 indicates a center point ahead by 1 cm from a center of a vehicle.

TABLE 6

| Road[k] | std | (double) x,y,z[cm] Center-Line Cordinates |
| | | (double) yaw[rad] Tangential Line Yaw Angle |
| | | (double) pit[rad] Tangential Line Pitch Angle |
| | | (double) rol[rad] Tangential Line Roll Angle |
| | | (char) bool Drawing Judgment |

Road [k].std.x,y,z represents coordinates of a remarkable point on a road center line in a global coordinate syetem. This remarkable point exists ahead by "k" cm from the vehicle center.

Road [k].yaw represents a yaw-directed rotation angle of a road tangential vector at a remarkable point relative to a preceding node.

Road [k].pit represents a pitch-directed rotation angle of a road tangential vector at a remarkable point relative to a preceding node.

Road [k].rol represents a roll-directed rotation angle of a road tangential vector at a remarkable point relative to a preceding node.

Road [k].bool has "1" for a broken line to be drawn and "0" for a space in the broken line in a global coordinate system and is used for writing data into a memory.

As the function ReadRoadData( ) has determined transformation parameters of each of the nodes, the function "MakeRoad( )" determines transformation parameters of each remarkable point relative to a preceding node and obtains global coordinates of each remarkable point and tangential vector thereat by synthethizing transforms. The transformation parameters of a remarkable point relative to a preceding node can be determined by using the functions Clothoid ( ) and Curve ( ).

Figure 16:
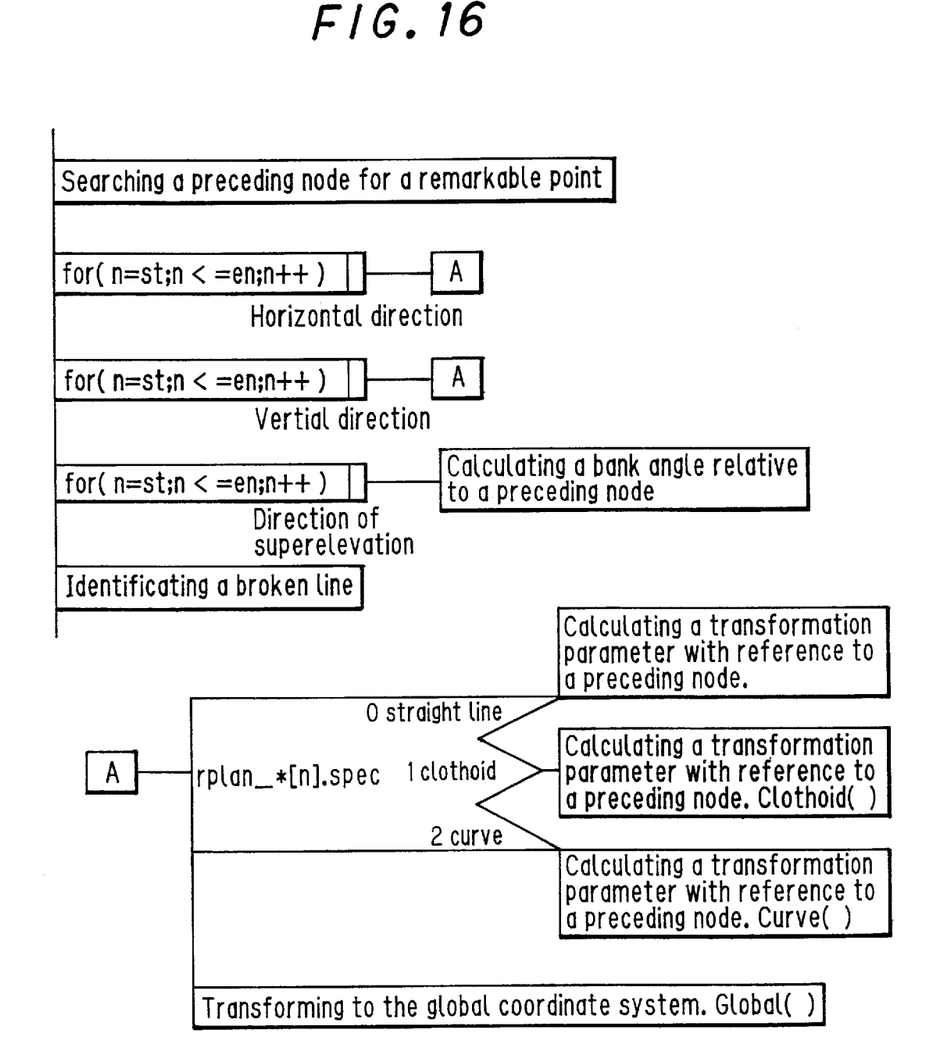
FIG. 16 is an exemplified flowchart for generating a road image.

The processing procedure to be performed by the ECU 2 is shown in FIG. 16.

To update road data (for adding data concerning an increment of travelling distance), the ECU determines road data for a one cycle distance determined by a running speed of the vehicle and adds the data to the stored road data "road [ ]" by using the function "MakeRoad( )". In this case, it is of course needed to previously delete the data relating to an already travelled road.

The function "car_position( )" for calculating a parallel displacement of the vehicle is now described below in detail wherein:

Input: int track . . . Position (distance) [cm] in a global coordinate system double velo,t_lc . . . Vehicle running speed [km/h], Lane change time [sec]

double my_start . . . Side offset value [cm] of the own vehicle at a start point mnt_st . . . Vehicle start point (distance) [cm]

double wroad . . . Lane width [cm]

char lc_fname . . . Lane change data file

Output: Road came_posi . . . Lane change data (local transformation parameter according to lane change)

The local transformation parameter with lane change is calculated according to lane change data.

Table 7 shows a content of output data "came_posi".

TABLE 7

| came_posi | std | (double) x,y,z[cm] Offset value from a road center |
| | | (double) z Not used. |
| | (double) yaw[rad] | Yaw Angle of vehicle |
| | (double) pit[rad] | Not used |
| | (double) rol[rad] | Not used |
| | (char) bool | Not used |

Figure 17:
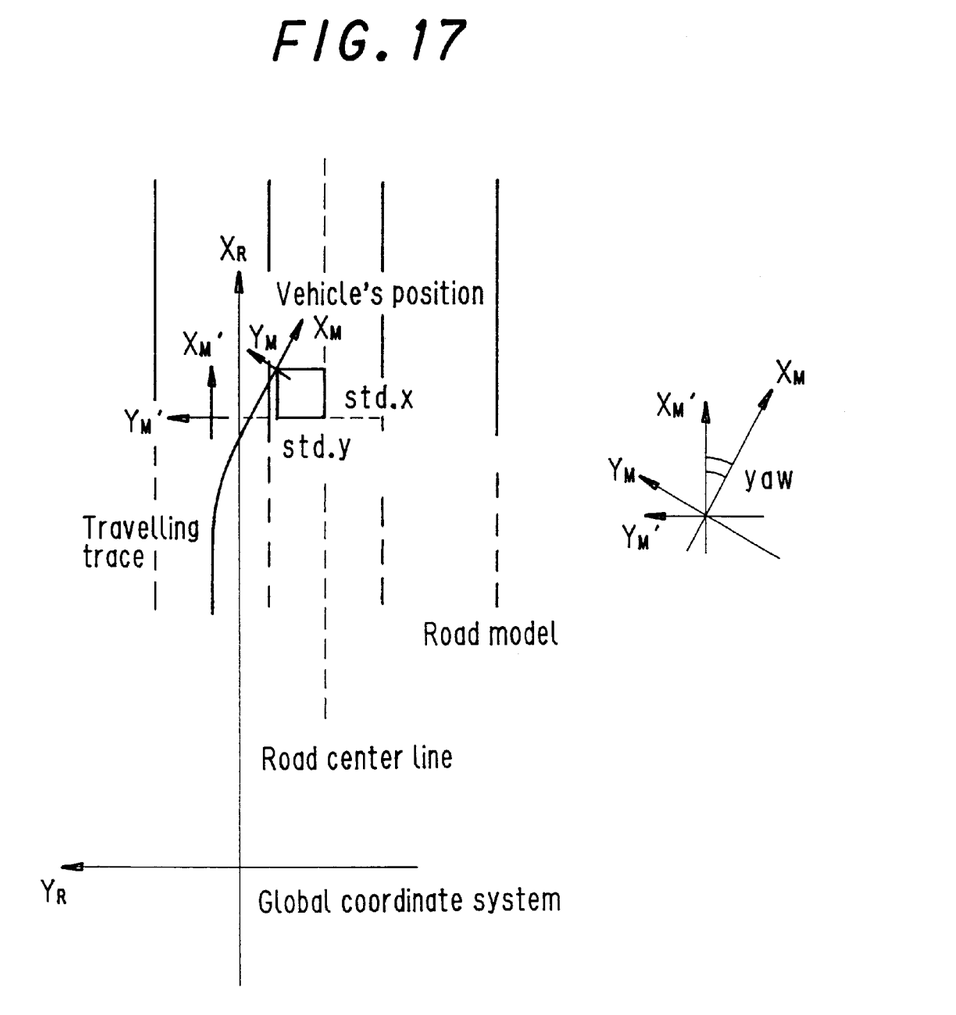
FIG. 17 shows a coordinate system when updating a vehicle location on a road.

FIG. 17 shows a coordinate system of the parameter "car position( )".

The function "RealToImage( )" for projective transformation is described below in detail wherein:

Input: Road road[] . . . Road center-line data

Road came_posi . . . Lane change data (local transformation parameter according to lane change)

C_ARA *came_para . . . Camera viewpoint parameter int car_sft . . . Distance [cm] that the vehicle travels for delay time of taking an image short *ip . . . Address of a header of an image memory Option *opt . . . Optional parameter The function "RealToImage( )" is used for converting road center line data defined in the global coordinate system into the data in the vehicle coordinate system by using transformation parameters of the vehicle coordinate system, converting already inputted data of "C13 PARA type came_para" (a data structure member of a camera parameter) into data in a pickup plane coordinate system by projective transformation method, quantizing the data and writing the quantized data in the image memory. The data "C_PARA type came_para" (the data structure member of the camera parameter) is defined in Table 8.

TABLE 8

| came_para | (double) fc | Focal distance [mm] |
|---|---|---|
| | (double) hc | Camera level [m] |
| | yaw | (double) si sin( ) |
| | Yaw angle | (double) co cos( ) |
| | pit | (double) si sin( ) |
| | (Pitch angle) | (double) co cos( ) |
| | rol | (double) si sin( ) |
| | (Roll angle) | (double) co cos( ) |

Figure 18:
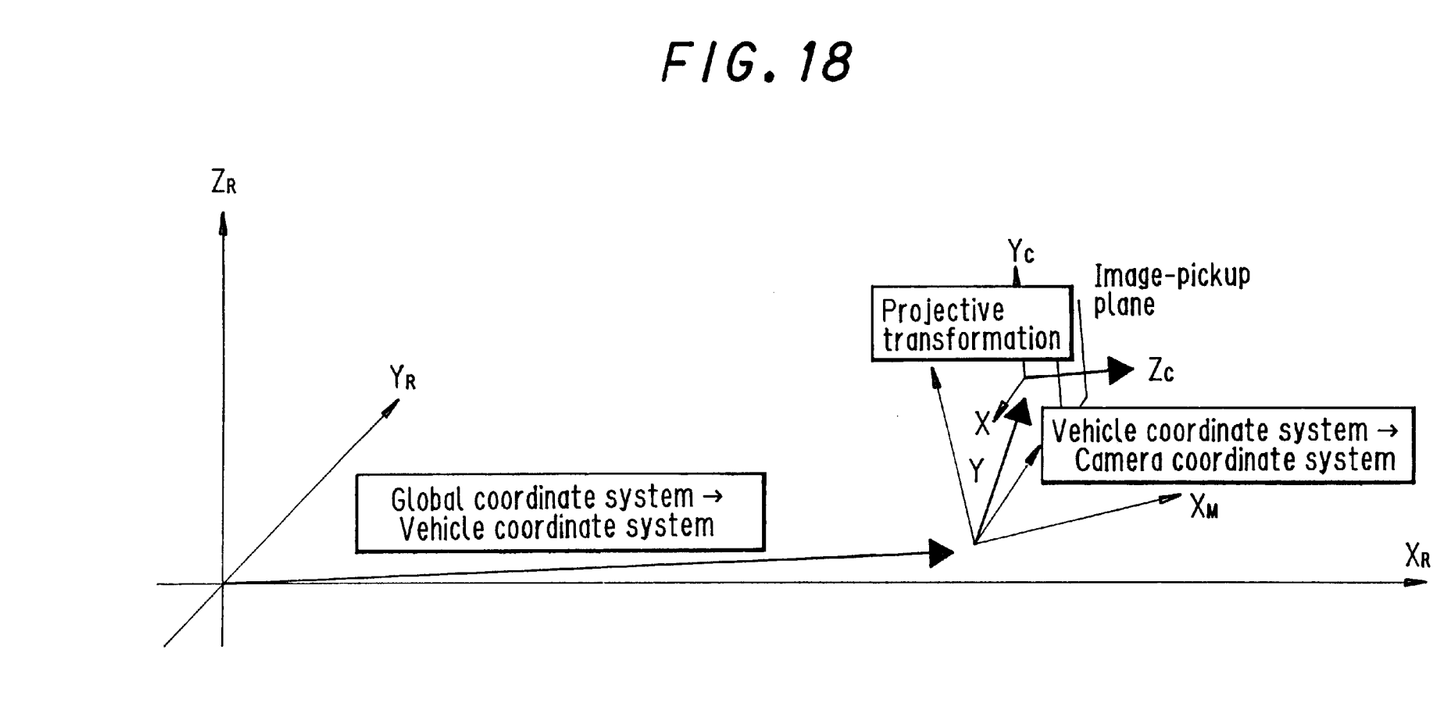
FIG. 18 shows a correlation between a road coordinate system, a vehicle coordinate system and a camera coordinate system when transforming coordinates.

The transformation of the road center-line data to the camera pickup-plane image data is realized in the order: global (road) coordinate system→ vehicle coordinate system→ camera coordinate system→ image-pickup-plane coordinate system as shown in FIG. 18.

The practical coordinate transforming procedure is shown in Table 9.

TABLE 9

| Global coordinate system to Vehicle coordinate system | The road coordinate system is translated to an own vehicle position. aw direction rotation (about Z-axis) of the vehicle is transformed. A yaw angle is determined by using a tangent of a horizontal curve . Pitch direction rotation (about Y-axis) of the vehicle is transformed. A pitch angle is determined by using a tangent of a vertical curve. Roll direction rotation (about X-axis) of the vehicle is transformed. A rotation angle is determined by using a super-elevation. A shift value from the road center line to the vehicle position (including a shift value for lane change) is translated. Yaw direction rotation (about Z-axis) of the vehicle after lane change is transformed. An initial pitch angle of the vehicle (an incline of the vehicle in the pitch direction to a road in an initial state) is transformed by rotation (about Y-axis). |
|---|---|
| Vehicle coordinate system to camera coordinate stystem | The vehicle coordinate system is translated by an offset value of the camera mounting. |
| Camera coordinate system to Image pickup plane coordinate system | Projective transformation |

Figure 19:
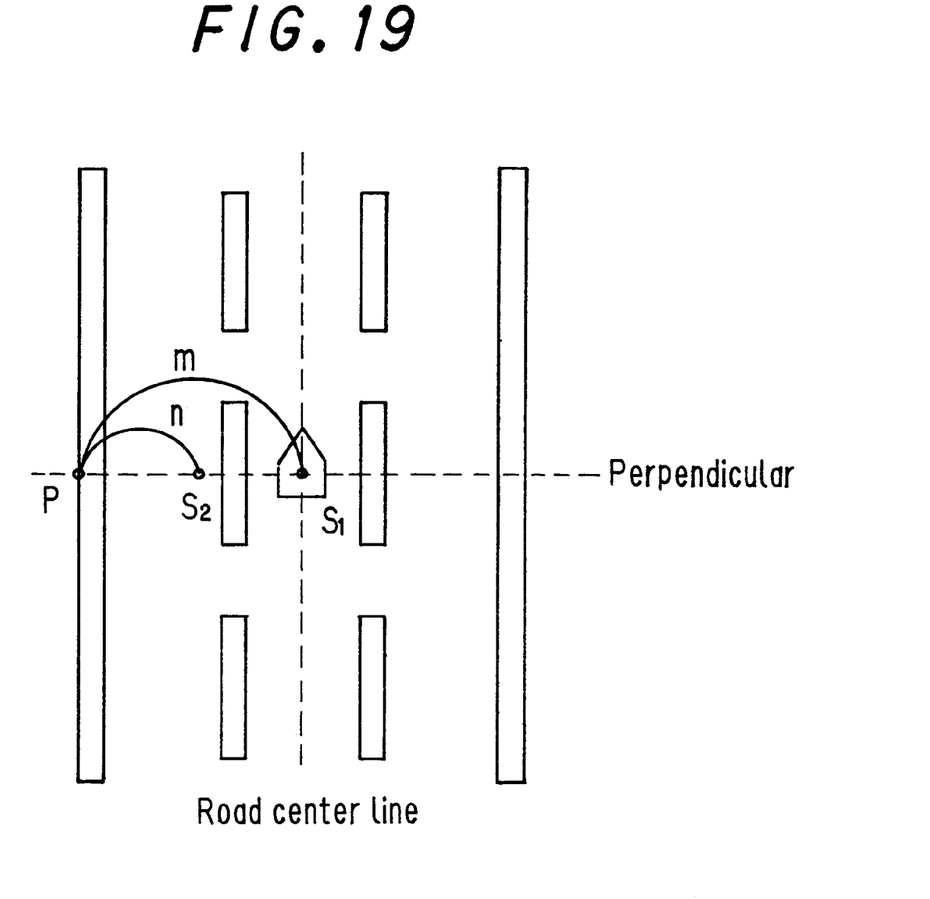
FIG. 19 shows a relation between positions on a road when determining an end point of a white line from a center point of a road.
Figure 20:
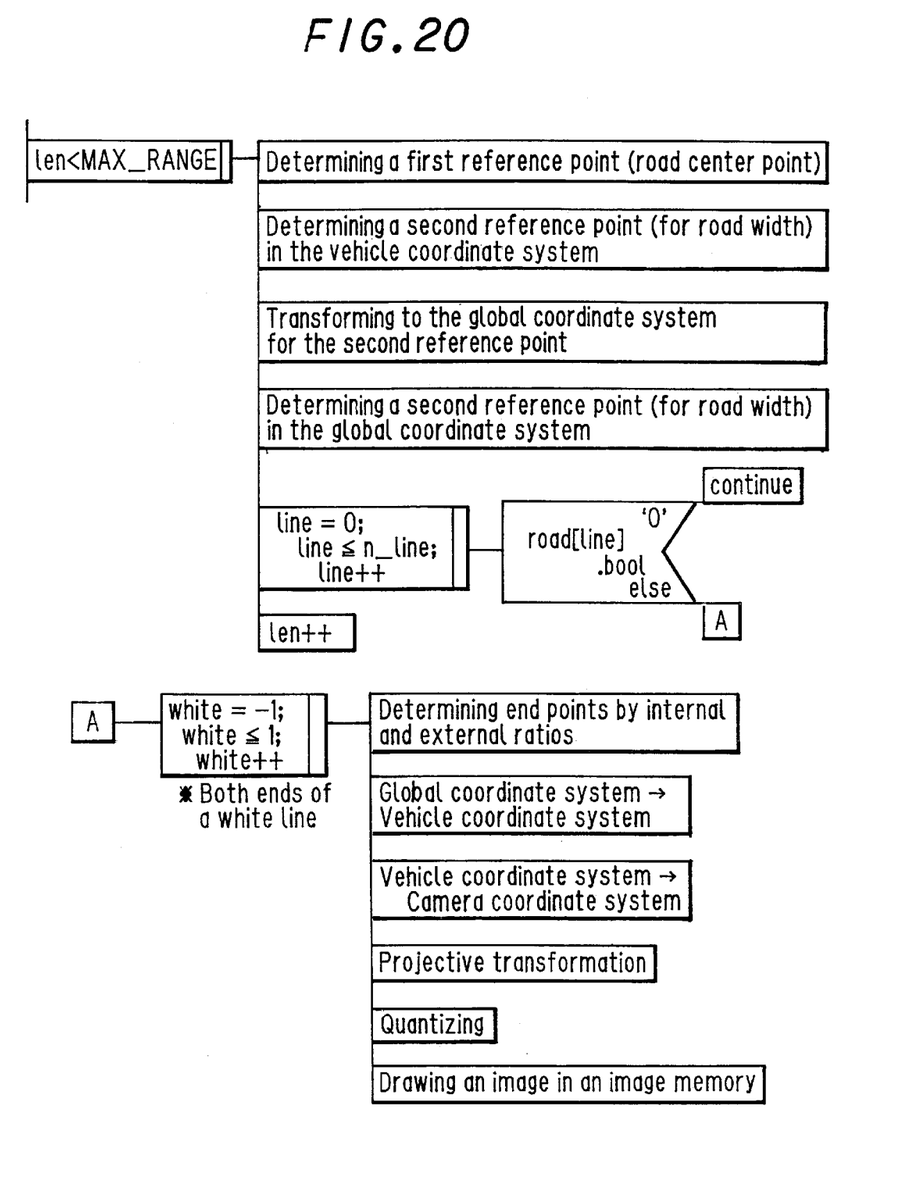
FIG. 20 is an exemplified flowchart describing a procedure for determining an end point of a white line from a center point of a road.

As shown in FIG. 19, coordinates of an end point P are calculated from coordinates of a road center point S1 by dividing road width and white stripe width with an external-to-internal ratio of m/n on a perpendicular to a center line of the road with reference to a suitable point S on a plain surface of the road. In this instance, PS1:PS2=m:n (m and n are known values).

As is apparent from the foregoing, a road image display device according to an aspect of the present invention can display a road image taken from a fixed viewpoint by scrolling at a specified speed as one would feel driving a vehicle thereon and which includes road design data inputting means for inputting road design data concerning a straight line area, a clothoid curve (curve of a relaxed curvature) area and a circular-arc area for a distance of a travelling road and road image generating means for generating a road image representing a straight-line area, clothoid curve area and a circular-arc area according to the input road design data. This display device can produce in particular an image of a road representing a curve of relaxed-curvature joining a straight line with a circle of a constant curvature.

In a road image display device according to another aspect of the present invention, means for inputting road design data concerning up-and-down slopes and banks for a distance of a travelling road are further provided to generate a road image representing upward and downward slopes and banks of the road according to the input road design data.

In a road image display device according to a further aspect of the present invention, means for selectively changing a viewpoint position relative to a travelling road image is still further provided to generate a road image being viewed from the selected viewpoint position, thus making it possible to freely produce a road image being viewed from a desired viewpoint set, e.g., at a specified level on a center line or a left lane on a current road image or to produce a road image following to changing lanes by gradually changing a viewpoint from the right to the left or vice versa.

What is claimed is:

1. A road image display device for displaying an image of a designed road from road design data of the designed road, comprising:

road design data inputting means for inputting the road design data comprised of at least straight-line areas, clothoid curve areas and circular-arc areas as designed for the designed road; and road image generating means for progressively generating a road image on said display screen simulating a directly forward view of the designed road from within a vehicle travelling on the designed road, said road image based solely on and representing the road design data comprising said at least straight-line areas, clothoid curve areas and circular-arc areas according to said inputted road design data, and said road image generating means progressively modifying said generated road image in response to simulating the travelling on the designed road at a rate corresponding to a speed of the vehicle on the designed road to continually provide the directly forward view representing an actual directly forward view of the designed road from within the vehicle.

2. A road image display device as defined in claim 1, characterized in that said road design data inputting means includes means for inputting road design data concerning upward and downward slopes for the designed road to generate said road image by also representing the upward and downward slopes of the road according said inputted road design data.

3. A road image display device as defined in any one of claims 1 and 2, characterized in that said road design data inputting means includes means for inputting road design data concerning banks in the designed road to generate said road image by also representing the banks of the road according said inputted road design data.

4. A road image display device as defined in claim 1 or 2, characterized in that said road design data inputting means includes means for selectively changing a viewpoint position relative to the road to generate said road image as though being viewed from the selected viewpoint position.

5. A road image display device as defined in claim 1, characterized in that said road design data inputting means includes means for inputting lane change data for said road image generating means to generate said road image as though the vehicle is changing lanes on the road.

* * * * *